United States Patent [19]

Murota et al.

[11] Patent Number: 4,848,969
[45] Date of Patent: Jul. 18, 1989

[54] MARINE FENDER

[75] Inventors: Nobuo Murota, Yokohama; Hitoshi Akiyama, Zushi, both of Japan

[73] Assignee: Bridgestone Corporation, Tokyo, Japan

[21] Appl. No.: 25,032

[22] Filed: Mar. 12, 1987

[30] Foreign Application Priority Data

Mar. 14, 1986 [JP] Japan .................................. 61-54625

[51] Int. Cl.⁴ .............................................. E02B 3/22
[52] U.S. Cl. .................................... 405/215; 405/212; 114/219; 267/141
[58] Field of Search ................ 405/212, 215; 114/219; 267/139-141

[56] References Cited

U.S. PATENT DOCUMENTS

| 3,563,525 | 2/1971 | Narabu | 267/140 |
| 3,600,896 | 8/1971 | Tateisi et al. | 405/215 |
| 3,610,609 | 10/1971 | Sobel | 267/140 |
| 4,136,632 | 1/1979 | Day et al. | 114/220 |
| 4,319,539 | 3/1982 | Fujii et al. | 114/219 |
| 4,351,257 | 9/1982 | Brown | 114/219 |
| 4,433,942 | 2/1984 | Russell et al. | 267/140 X |
| 4,628,850 | 12/1986 | Day et al. | 114/219 |

FOREIGN PATENT DOCUMENTS

| 2635571 | 2/1977 | Fed. Rep. of Germany | 405/215 |
| 210112 | 11/1984 | Japan | 405/212 |
| 88709 | 3/1985 | Japan | 405/212 |

Primary Examiner—Randolph A. Reese
Assistant Examiner—John A. Ricci
Attorney, Agent, or Firm—Sughrue, Mion, Zinn, Macpeak & Seas

[57] ABSTRACT

A marine fender comprises a fender body and a thick elastic laminated body. The elastic laminated body is composed of an outer cover, a light elastic member filled in the outer cover and a rigid plate embedded in the bottom of the outer cover.

6 Claims, 4 Drawing Sheets

FIG_1
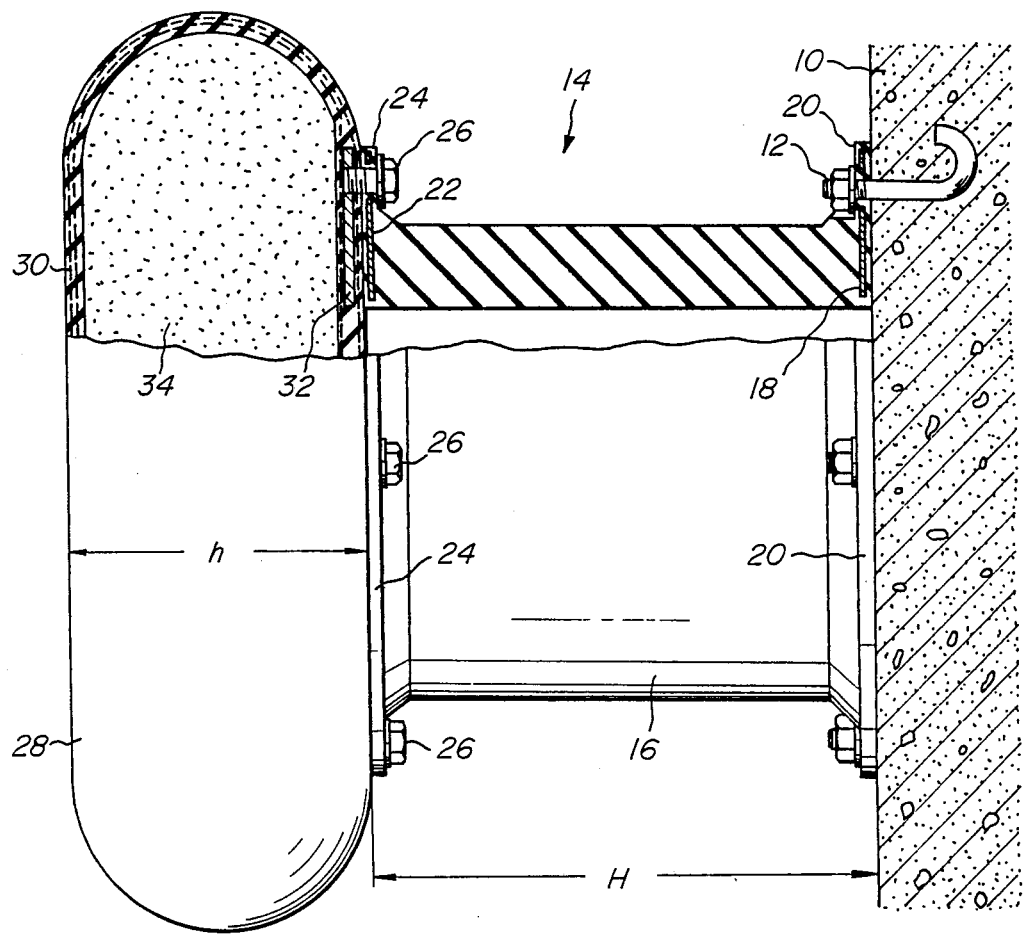

FIG_2
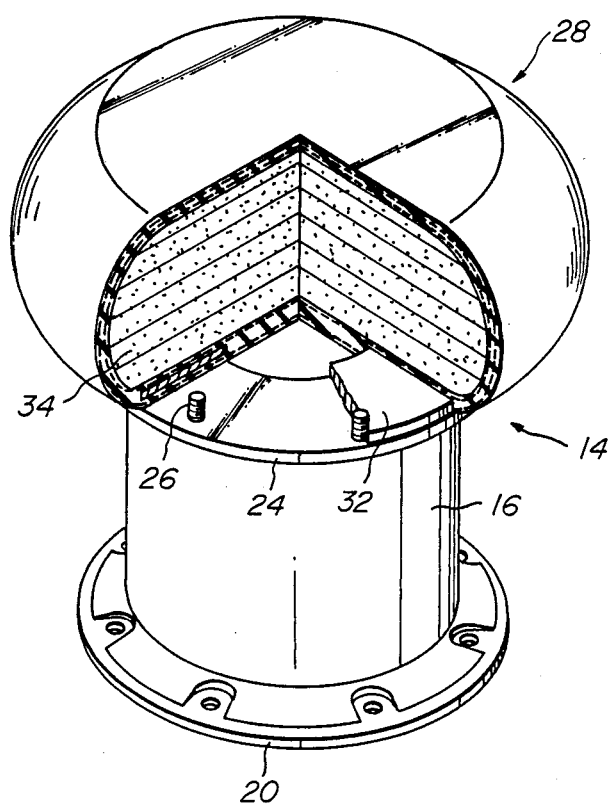

FIG_3
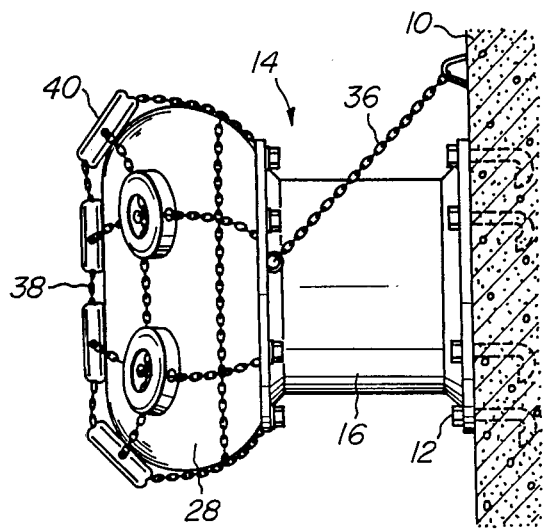
FIG_4
PRIOR ART
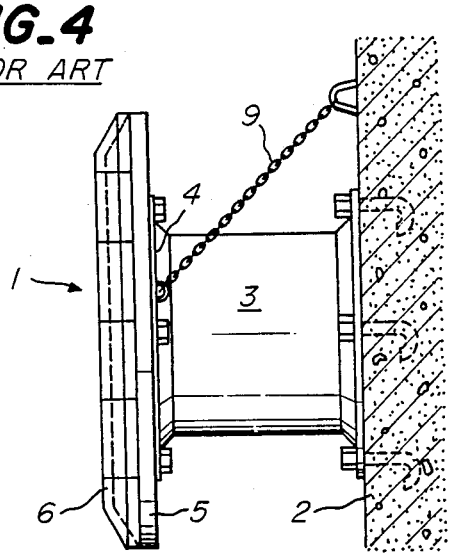

FIG_5
PRIOR ART
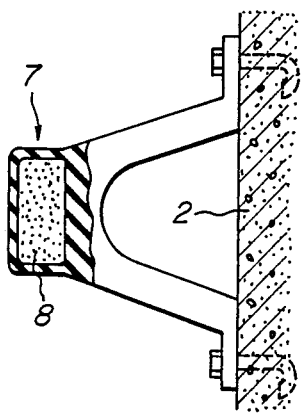
FIG_6
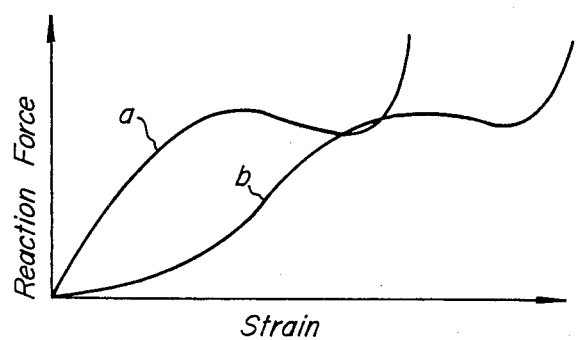

MARINE FENDER

BACKGROUND OF THE INVENTION

1. Field of the Invention

This invention relates to a marine fender fixed and projecting laterally from a berthing base such as quay wall and the like.

2. Related Art Statement

It is known that a marine fender such as a hollow cylindrical fender, a hollow truncated fender, a hollow pyramid fender and the like, all of which being made from rubber or rubbery elastomeric material, is arranged in a protruding arrangement onto the berthing base such as quay wall or the like.

A marine fender 1 shown in FIG. 4 is one of these fenders. This fender 1 is fixed in a lateral posture to a quay wall 2 and comprises a fender body 3 of a thick hollow cylindrical shape made of rubber, a rigid wall member (ring plate) 4 attached to the head portion of the fender body 3, a steel frame member 5 threaded onto the wall member 4, and a shock receiving plate 6 made of a synthetic resin and arranged along the surface of the steel frame member 5.

The marine fender 1 generally has a deformation characteristic as shown by a strain-reaction force curve a in FIG. 6. Since the reaction force of the marine fender 1 is large at an initial compression state as seen from the curve a, the marine fender 1 has drawbacks that the hull of the vessel is apt to be damaged and the pitching and rolling movement of the mooring vessel is made large.

Further, since the marine fender 1 is provided at its head portion with the steel frame member 5, if the hull of the vessel is not flat, a local concentration of loading is apt to be caused, resulting in the damaging of the hull.

A well-known rubber marine fender 7 shown in FIG. 5 is provided at its head portion with a foamed body 8 of a flexible resin embedded therein, so that it has a deformation characteristic as shown by a curve b in FIG. 6 owing to the presence of the foamed body 8. Thus, this rubber fender 7 eliminates the above mentioned problems inherent in the fender 1. Further, since the weight of the head portion is lighter than that of the fender 1, it is not required to use a chain 9 for supporting the weight of the head portion as used in the fender illustrated in FIG. 3.

In the rubber marine fender 7 of FIG. 5, however, the rubber body should be vulcanized together with the foamed body 8 embedded therein, so that the production is technically difficult because the foamed body 8 is weak when subjected to high-temperature heating. In order to solve this problem, it may be considered that the head portion including the foamed body 8 is joined to the fender body through an adhesive. In the latter case, the head portion is peeled off from the fender body at the joint face because the marine fender is generally subjected to a large deformation amounting to 50% deformation, so that the use of the adhesive can not be adopted.

When the foamed body 8 is damaged by frictionally contacting the head portion of the rubber fender 7 with the hull of the vessel to break the head portion, the broken rubber fender 7 should be replaced with a new one as a whole, which becomes disadvantageous economically.

SUMMARY OF THE INVENTION

It is, therefore, an object of the present invention to provide a marine fender, a shock receiving head portion of which being made of a flexible and light material and being replaceable.

According to the invention, there is the provision of a marine fender comprising a fender body made of rubber or rubbery elastomeric material and provided at the head portion with a rigid wall member embedded therein, and a thick elastic laminated body composed of a bag-like outer cover made of rubber or rubbery elastomeric material, a light elastic member filled in the outer cover and containing gas therein and a rigid plate embedded in the bottom of the outer cover, the elastic laminated body being arranged so as to cover the head portion of the fender body and joined to the fender body through the wall member and rigid plate by means of bolts.

BRIEF DESCRIPTION OF THE DRAWINGS

FIG. 1 is a side view partly shown in section of an embodiment of the marine fender according to the invention;

FIG. 2 is a partially cutaway perspective view of the marine fender shown in FIG. 1;

FIG. 3 is a side view illustrating an application form of the marine fender shown in FIG. 1;

FIG. 4 is a side view of the conventional marine fender;

FIG. 5 is a partially cutaway side view of another conventional marine fender; and FIG. 6 is a graph showing a relation between strain and reaction force as a deformation characteristic of the marine fenders.

BRIEF DESCRIPTION OF THE PREFERRED EMBODIMENTS

The invention will be described with reference to the embodiment shown in FIGS. 1 to 3 below.

Referring to FIG. 1, a marine fender 14 according to the invention is secured to a quay wall 10 through plural anchor bolts 12 which are embedded to the quay. This fender 14 comprises a fender body 16 of a thick hollow cylinder made of rubber, and an elastic laminated body 28 threaded to the head portion of the fender body 16 through plural bolts 26.

The fender body 16 is a well-known structure capable of use alone as a marine fender, and is provided at the bottom portion with a rigid steel plate 18 embedded therein as a flange-like bottom wall 20 and at the head portion with a rigid ring steel plate 22 embedded therein as a flange-like head wall 24. When the fender body 16 is used alone, it exhibits the deformation characteristic as shown by the curve a in FIG. 6.

The thick elastic laminated body 28 has a diameter larger than that of the fender body 16, and comprises a bag-like outer cover 30 made of rubber and reinforced with a canvas or the like, a foamed member 34 made of a flexible resin and fills in the bag-like outer cover 30, and a ring-like steel plate (rigid plate) 32 embedded in the bottom of the outer cover 30 and having a plurality of tapped holes. The ring-like steel plate 32 is fixed to the flange-like head wall 24 of the fender body 16 by means of bolts 26. The foamed member 34 is made from a flexible resin such as polyethylene, polyurethane and the like, or a natural rubber, or a synthetic rubber and is preferable to have an expansion ratio of from 5 to 50 times and a bulk density of from 0.02 to 0.2 g/cm³.

The foamed member 34 is composed of a single foamed sheet in the illustrated embodiment, or may be constituted by laminating a number of foamed sheets one upon the other. Further, the foamed member 34 may be filled in the outer cover 30 as a closed shell by enveloping the foamed member 34 with the unvulcanized outer cover 30 and then performing the vulcanization of the outer cover 30.

Moreover, it is preferable that the height h of the elastic laminated body 28 and the height H of the fender body 16 satisfy a relation of h=0.25H~0.75H. Also, the area of the top portion in the elastic laminated body 28 may be selected to bear the permissible surface pressure of the marine fender (which is obtained by dividing the deformational reaction force by the contact area).

Since the illustrated embodiment has the above described structure, when the vessel comes into contact with the marine fender 14, the elastic laminated body 28 including the foamed member 34 first stands against the hull of the vessel at a relatively small reaction force and flexibly follows and deforms to the displacement of the hull in a direction along the quay wall 10 and the slant or curved surface of the hull, so that the hull is hardly damaged. As the compressive deformation of the elastic laminated body 28 proceeds to a certain extent, the deformation of the fender body 16 starts to effectively absorb the berthing force (see the curve b in FIG. 6).

The other features of the marine fender 14 are as follows;

ⓐ Since the fender 14 is provided at the top portion with the elastic laminated body 28, the pushing force against the vessel is small, and the pitching and rolling movement of the mooring vessel becomes small.

ⓑ Since the elastic laminated body 28 including the foamed member 34 therein is light, the deflection due to the dead weight of the fender 14 is small and also the dependence on the suspending chain for preventing the fender from deflecting lowers.

ⓒ Different from a steel buffer member, the elastic laminated body 28 is not deteriorated by rust, and also the durability is not damaged.

ⓓ When the elastic laminated body 28 is damaged, only the damaged body may be removed for replacement from the fender body 14 by loosening the bolts 26, so that the maintenance and management fees are small in view of economical reasons.

ⓔ The deformation characteristic of the marine fender may be easily varied by selecting another elastic laminated body having different size and mounting it on the same fender body 16, so that the foundation cost can be reduced by the generalization of the components of the fender.

An application example of the above marine fender is shown in FIG. 3. In this example, the elastic laminated body 28 is covered by a net-like chain 38 having used tires therein to prevent the elastic laminated body 28 from being directly damaged due to the contact with the vessel and is suspended by a suspending chain 36 to support the weight of the head portion of the marine fender. This is particularly suitable when the elastic laminated body 28 is large size. In this case, the bending deformation due to the dead weight of the chain 38, used tires 40, the elastic laminated body 28 and the fender body 16 is prevented improving the service durability of the marine fender.

Also, instead of the foamed member 34 in the above embodiment, a plurality of spherical bodies each made of rubber or rubbery elastomeric material and filled with air therein, such as tennis balls and the like may be filled in the inside of the outer cover 30 in the formation of the elastic laminated body 28.

As mentioned above, according to the invention, the marine fender fixed to the berthing base such as quay wall may also comprise a fender body made of rubber or rubbery elastomeric material and provided at the head portion with a rigid wall member embedded therein, and a thick elastic laminated body composed of a bag-like outer cover made of rubber or rubbery elastomeric material, a light elastic member filling the outer and containing gas therein and a rigid plate embedded in the bottom of the outer cover and threaded to the wall member by means of bolts, so that the head portion of the marine fender is light and flexible and the improved buffering characteristic is obtained. Consequently, the marine fender according to the invention can prevent the damaging of the vessel. If the elastic laminated body is damaged during the repeated use, it is sufficient to replace only the damaged body with a new one with the leaving of the fender body, so that the maintenance and management fees can considerably be reduced.

What is claimed is:

1. A marine feeder fixed to a berthing base, comprising; a fender body made of rubber or rubbery elastomeric material and provided at the head portion with a rigid wall member embedded therein, and a thick laminated body composed of a bag-like outer cover made of rubber or rubbery elastomeric material, a light elastic member composed of a foam body having an expansion ratio of 5 to 50 times and a bulk density of 0.02 to 0.2 g/cm³ placed in the outer cover and a rigid plate embedded in the bottom of the outer cover, the elastic laminated body being arranged so as to cover the head portion of the fender body and joined to the fender body through the wall member and rigid plate by means of bolts wherein the height H of the fender body and a height h of the elastic laminated body satisfy a relation of h=0.25H to 0.75H.

2. The marine fender according to claim 1, wherein said foamed body is a flexible resin.

3. The marine fender according to claim 2, wherein said flexible resin is selected from the group consisting of polyethylene and polyurethane.

4. The marine fender according to claim 1, wherein said foamed body is rubber.

5. The marine fender according to claim 1, wherein said foamed body comprises foamed sheets laminated to each other.

6. The marine fender according to claim 1, wherein said foamed body comprises a unitary member filling said outer cover.

* * * * *